(12) United States Patent
Bajwa et al.

(10) Patent No.: US 10,952,054 B2
(45) Date of Patent: Mar. 16, 2021

(54) VEHICLE BASED CONTENT SHARING

(71) Applicant: Ford Global Technologies, LLC, Dearborn, MI (US)

(72) Inventors: Manpreet Singh Bajwa, Novi, MI (US); Omar Makke, Lyon Township, MI (US); Perry Robinson MacNeille, Lathrup Village, MI (US); Oleg Yurievitch Gusikhin, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1107 days.

(21) Appl. No.: 14/879,485

(22) Filed: Oct. 9, 2015

(65) Prior Publication Data

US 2017/0104824 A1   Apr. 13, 2017

(51) Int. Cl.
| | | |
|---|---|---|
| *H04W 4/80* | (2018.01) | |
| *H04W 4/44* | (2018.01) | |
| *H04W 4/02* | (2018.01) | |
| *H04L 29/06* | (2006.01) | |
| *H04W 84/04* | (2009.01) | |
| *H04W 84/12* | (2009.01) | |

(52) U.S. Cl.
CPC .............. *H04W 4/80* (2018.02); *H04L 65/40* (2013.01); *H04L 65/60* (2013.01); *H04W 4/025* (2013.01); *H04W 4/027* (2013.01); *H04W 4/44* (2018.02); *H04W 84/042* (2013.01); *H04W 84/12* (2013.01)

(58) Field of Classification Search
CPC ......... H04L 67/12; H04L 61/30; H04L 65/40; H04L 65/60; H04W 4/008; H04W 4/025; H04W 4/027; H04W 4/046; H04W 84/042; H04W 84/12

USPC ............ 709/201, 224; 715/717; 707/672, 10
See application file for complete search history.

(56) References Cited

U.S. PATENT DOCUMENTS

| | | | |
|---|---|---|---|
| 7,187,947 | B1 | 3/2007 | White et al. |
| 7,834,758 | B2 | 11/2010 | Peterson et al. |
| 8,682,004 | B2 | 3/2014 | Grigsby et al. |
| 8,881,216 | B2 | 11/2014 | Putnam et al. |
| 9,262,916 | B2 * | 2/2016 | Kim .................. G01C 21/3694 |
| 2007/0061725 | A1 | 3/2007 | Isaac et al. |

(Continued)

FOREIGN PATENT DOCUMENTS

| | | |
|---|---|---|
| EP | 2879107 A1 | 6/2015 |
| WO | 2014171940 A1 | 10/2014 |

*Primary Examiner* — Ario Etienne
*Assistant Examiner* — Sahera Halim
(74) *Attorney, Agent, or Firm* — Frank Lollo; Brooks Kushman P.C.

(57) ABSTRACT

An infotainment system in a vehicle includes at least one processor configured to, in response to occurrence of a trigger condition defined by an invitation from a source remote from the vehicle and identifying media content and to acceptance of the invitation, select a medium carrying the media content to play the media content. The trigger condition may be a current location of the vehicle matching a specified location, a weather condition at a current location of the vehicle matching a specified weather condition, a current speed of the vehicle exceeding a specified speed, a current date matching a specified date, or a current time of day matching a specified time of day. Alternatively, the trigger condition may be a signal indicating presence of a passenger or presence of a connection with a mobile device.

12 Claims, 5 Drawing Sheets

(56) References Cited

U.S. PATENT DOCUMENTS

2012/0151073 A1* 6/2012 Bai .................. G06F 17/30902
                                                709/228
2015/0006541 A1* 1/2015 Hampiholi ........ G06F 17/30053
                                                707/741

* cited by examiner

VEHICLE BASED CONTENT SHARING

TECHNICAL FIELD

This application is generally related to a communication system in a vehicle configured to share media content and play the media content based on a context associated with the content.

BACKGROUND

Drivers of vehicles have a constantly growing amount of information to observe and process to maneuver safely while driving on the open road. Drivers must not only know about and adhere to the rules of the road in their own right, but they must also be aware of what nearby vehicles are doing. Vehicle to vehicle (V2V) and vehicle to infrastructure (V2I) systems allow vehicles to communicate and share information allowing the drivers to focus on operation of the vehicle. One goal of the vehicular communication system is to allow a driver or passenger of the vehicle to safely control media played or displayed within the vehicle. Systems interfacing with V2V and V2I communication include vehicle infotainment systems, vehicle information systems, vehicle head-up displays, vehicle instrument clusters, and vehicle navigation systems. These services usually require multiple radio links in order to monitor surroundings of the vehicle including other vehicles, the roadway infrastructure, or the cloud.

SUMMARY

An infotainment system in a vehicle includes at least one processor configured to, in response to occurrence of a trigger condition defined by an invitation from a source remote from the vehicle and identifying media content and to acceptance of the invitation, select a medium carrying the media content to play the media content.

An infotainment system in a vehicle includes at least one processor configured to associate a driver specified trigger condition defining circumstances regarding when to play media content with an invitation from a source remote from the vehicle, and in response to occurrence of the trigger condition and acceptance of the invitation, select a medium carrying the media content to play the media content.

A method may be executed on a computer. The computer receives from a first vehicle an invitation identifying media content, an alias of another vehicle and a trigger condition. The computer then identifies a target vehicle associated with the alias, and in response to a match of the trigger condition with a current condition of the target vehicle, the computer sends to the target vehicle the invitation.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

This disclosure, among other things, proposes communication systems and methods for vehicle to vehicle (V2V), vehicle to infrastructure (V2I) and vehicle to cloud communication. The communication is an invitation or share request of media content associated with a context associated with the media content. The context may also be referred to as a trigger condition used to trigger the playing of the media content. The media content includes a song, music album, talk show, news broadcast, genre of music, movie, television show, advertising jingle, advertisement, or other multi-media item. The context includes a current location of the receiving vehicle, a weather condition at a current location of the receiving vehicle, a current speed of the receiving vehicle, a date or a time of day on the date. Also, the context may include a signal in the receiving car based on detection of a passenger or a connection with a mobile device. For example, a first system may generate an invitation or share request of media content that is sent to a second system. The first system may be a computer, a mobile device, a vehicle system such as an infotainment system, heads-up display, instrument cluster, or other system. The invitation may be a link or pointer to the media content or a description or a file of the media content. The media content may be speech, music, or images. The invitation or share request may include a context associated with the media content. In an alternative embodiment, a second system may upon reception of the invitation, associate the media content with a context. The second system may store the link, pointer, description of or file of the media content. Upon conditions of the second system matching the context associated with the media content, the second system may locate, resolve, and play the media content.

For example, one vehicle may send to a second vehicle a share request including the description of a song "Riders on the Storm" by The Doors with the context to play when it is raining. The description of the song and context may then be stored by the second vehicle until a time that rain is detected. The detection of rain may be based on a rain sensor of the vehicle, activation of windshield wipers, or a weather report. The weather report may be broadcast or point to point. The weather report may utilize terrestrial broadcasts, satellite systems, cellular systems, or Wi-Fi systems. Upon a match of the context, the second vehicle may scan broadcast stations, scan files stored in an infotainment system, scan satellite broadcasts, scan mobile devices connected to the information system of the second vehicle or search the internet for the song. Upon location of the song, the second vehicle may either play the song or prompt a passenger in the second vehicle to play the song.

Another example is a request to share an album "Stormwatch" by Jethro Tull. When received by the second vehicle, a passenger associates the song with a context to play the album during a thunderstorm. The detection of a thunderstorm may be by way of a rain sensor of the vehicle, activation of windshield wipers, a weather report, or may specifically be a broadcast message from the National Oceanic and Atmospheric Administration (NOAA) indicating a thunderstorm in a county proximate to the vehicle. Another example is a request to play Baz Luhrmann—Everybody's Free to Wear Sunscreen when a destination to the beach is entered into a navigation system. In another example, a request may be to play Navy SEAL Admiral Bill McRaven's 2014 commencement speech when the receiving vehicle is within 5 miles of The Tower at the University of Texas at Austin.

Social context may also be used to qualify playing of the share request. For example, an infotainment system may play a "happy birthday" song when a passenger enters the receiving vehicle. Alternatively, the second vehicle may play a "happy birthday video" when the second vehicle detects connection with a specific mobile device and the second vehicle is not in motion or the second vehicle is in "Park". The video may be played on an infotainment system or projected onto the window of the vehicle using a heads-up display. Other social context may include an anniversary, purchase of a new house, or a new job. Another social context may include limiting the genre of content played when a specific mobile device is detected or connected with an infotainment system or a weight of a passenger detected by an occupant detection system is within a certain range. The limitation of the genre is similar to parental control of content played.

The communication may be a Radio Frequency (RF) communication and may be received by an other vehicle. The other vehicle, upon reception of the information, may process the information including decoding the information and updating the information. Typically, a message sent by a vehicle is broadcast to all surrounding vehicles, including the other vehicle and surrounding vehicles. However, the communication may also include transmission and reception of RF signals from a vehicle infrastructure. The vehicle infrastructure may include data including advertising for local and national companies, billboard signs, location of the transmitting source, traffic light timing, road conditions, road traffic, weather conditions, and emergency vehicle operation. This may include images from camera systems in a vicinity of the accident. The RF communication may be integrated with a vehicle infotainment system, may be a standalone embedded modem, or may be a passenger's mobile phone coupled with an infotainment system.

Figure 1A:
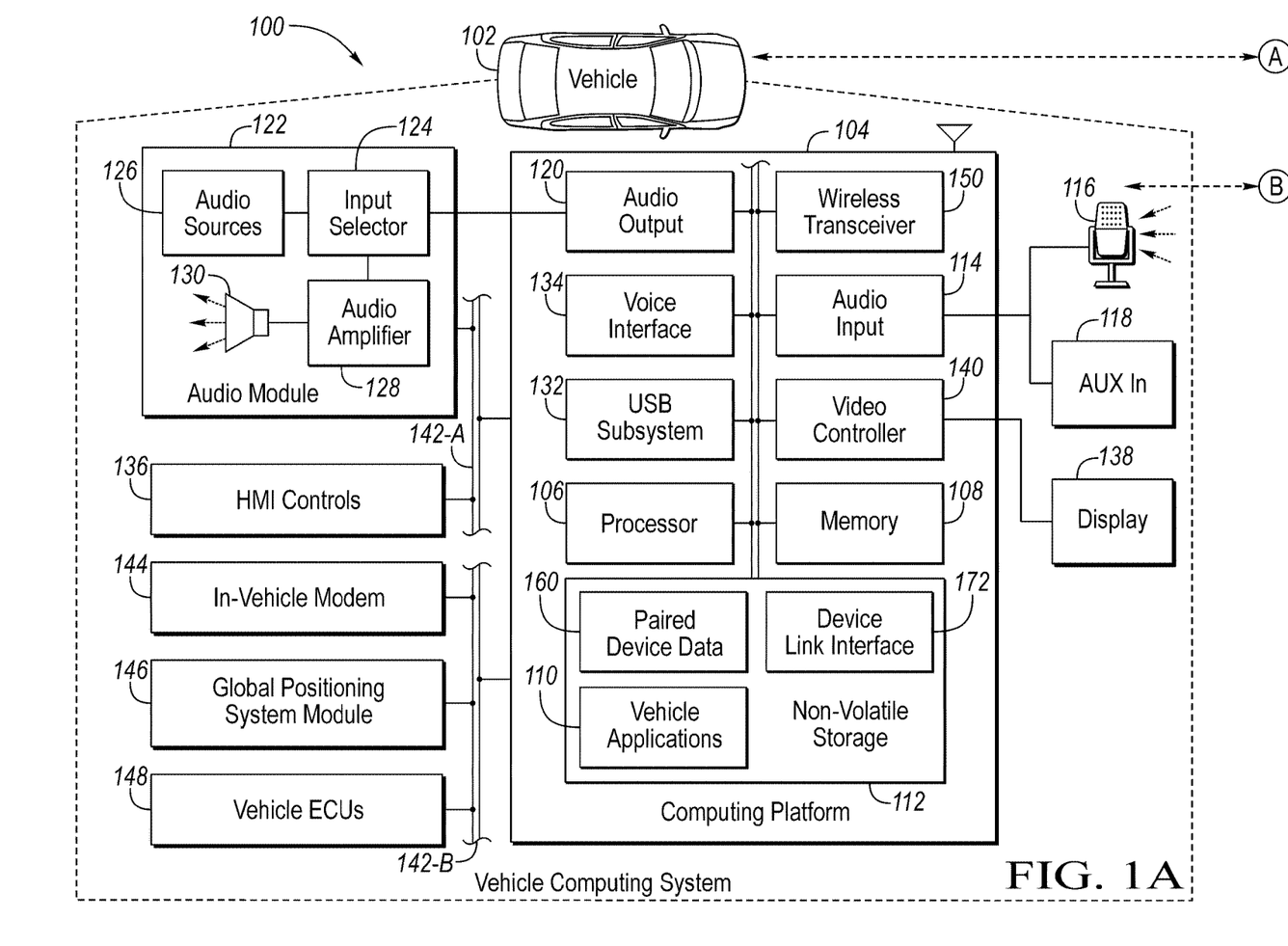
FIGS. 1A and 1B are an exemplary block topology of a vehicle infotainment system.
Figure 1B:
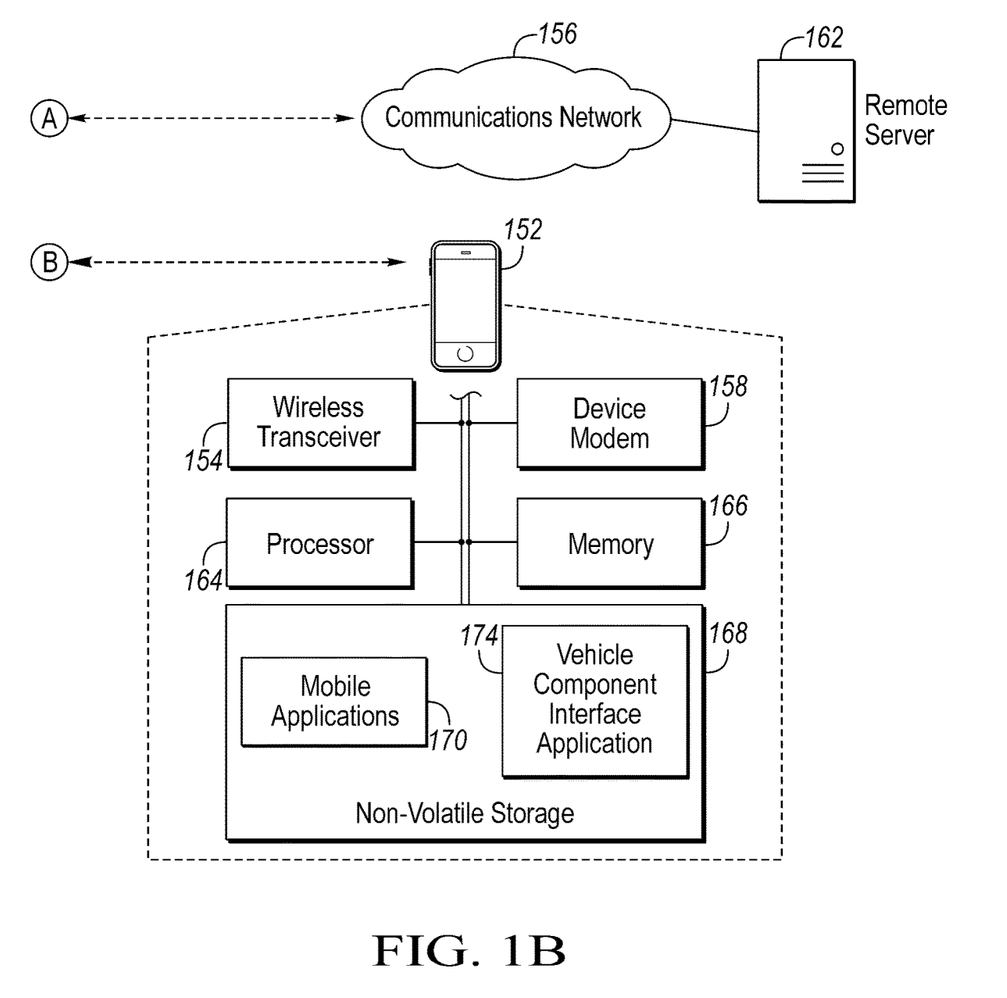

FIGS. 1A and 1B illustrate an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. The processor 106 may be coupled with volatile memory such as Random Access Memory (e.g., DRAM or SRAM). The processor may also be multiple processors in multiple computing units, which each perform a part of the overall driver alert. For example, one processor may perform audible alert functions, located in the audio module (122), while a different processor in the video controller (140) handles the visual alert, predicated from the same alert message. Computer-executable instructions may be compiled or interpreted from computer programs created using a variety of programming languages and/or technologies, including, without limitation and either alone or in combination, Java, C, C++, C #, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142A, and the vehicle modem 144, GPS module 146, and vehicle ECUs 148 may communicate with the computing platform 104 over a second in-vehicle network 142B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. The wireless modules may transmit data at a carrier frequency or a center frequency. The center frequency is an important aspect of a wireless system by impacting noise immunity and bandwidth. For example, typical remote keyless entry systems operate at 315 MHz in the United States, and 433 MHz in Europe, while Wi-Fi and Bluetooth may operate at frequencies including frequencies over 2 GHz such as 2.4 GHz. Additionally or alternately, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnect to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interfaced 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif. The vehicle component interface application 174 may be once such application installed to the mobile device 152.

The vehicle component interface application 174 of the mobile device 152 may be configured to facilitate access to one or more vehicle 102 features made available for device configuration by the vehicle 102. In some cases, the available vehicle 102 features may be accessible by a single vehicle component interface application 174, in which case the vehicle component interface application 174 may be configured to be customizable or to maintain configurations supportive of the specific vehicle 102 brand/model and option packages. In an example, the vehicle component interface application 174 may be configured to receive, from the vehicle 102, a definition of the features that are available to be controlled, display a user interface descriptive of the available features, and provide user input from the user interface to the vehicle 102 to allow the user to control the indicated features. As exampled in detail below, an appropriate mobile device 152 to display the vehicle component interface application 174 may be identified, and a definition of the user interface to display may be provided to the identified vehicle component interface application 174 for display to the user.

Figure 2:
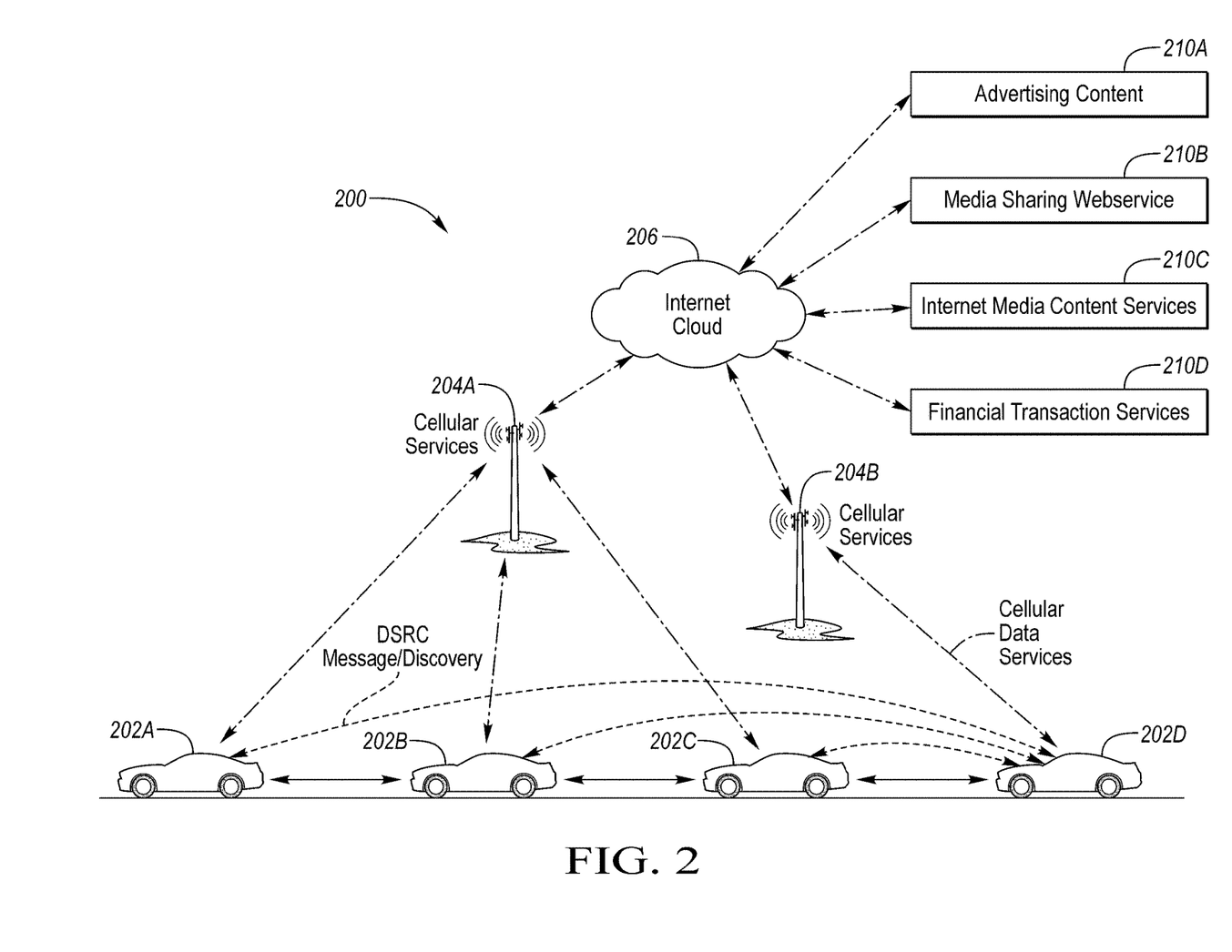
FIG. 2 is an exemplary illustration of a vehicle communication system relaying information between vehicles and a vehicular infrastructure.

Systems such as the system 100 and system 200 may require mobile device 152 pairing with the computing platform 104 and/or other setup operations. However, as explained in detail below, a system may be configured to allow vehicle occupants to seamlessly interact with user interface elements in their vehicle or with any other framework-enabled vehicle, without requiring the mobile device 152 or wearable device 152 to have been paired with or be in communication with the computing platform 104.

FIG. 2 is an exemplary illustration of a vehicle communication system 200 relaying information between vehicles 202 and a vehicular infrastructure. The communication system 200 illustrates multiple vehicles (202A, 202B, 202C, and 202D) in which at least one of the vehicles 202D is able to transmit a message to the other vehicles. In this illustration, vehicles 202B and 202D are able to transmit and receive messages via a vehicle to vehicle (V2V) network. An example of a V2V communication is Dedicated Short Range Communication (DSRC). In the U.S. the FCC has allocated a 75 MHz window in the 5.9 GHz frequency to be used for DSRC, however other vehicle to vehicle (V2V) communication protocols and mediums may be used. Vehicles may communicate via a cellular network. For example, vehicle 202B may have an embedded modem allowing connection with cellular tower 204A. Cellular tower 204A may be coupled with the cloud 206 via the internet and with other cellular towers such as 204B, thus allowing a connection between 202B and 202D via the cellular network. The cellular network may use a voice channel or a data channel. Here, the communication includes an invitation also called a share request from one vehicle targeting another vehicle. The share request includes an identifier of media content. The media content may be advertising content 210A message such as a jingle, audio commercial, or video commercial. The media content may be speech, music or imagery such as a song, show, music video, talk show, lecture, or instructional message. The speech, music or imagery may be held by a media sharing web service 210B or an internet media content service 210C. When acceptance of and request to play media content via the cloud 206, the use of financial transaction services 210D may be used to account for media rights and compensation for the copy, display, use or performance of those rights or for completing a transaction of sale for merchandise or services advertised by the media content. The vehicles 202A-D may broadcast an alias, nickname, or other moniker to allow others to identify a vehicle without providing revealing information.

Figure 3:
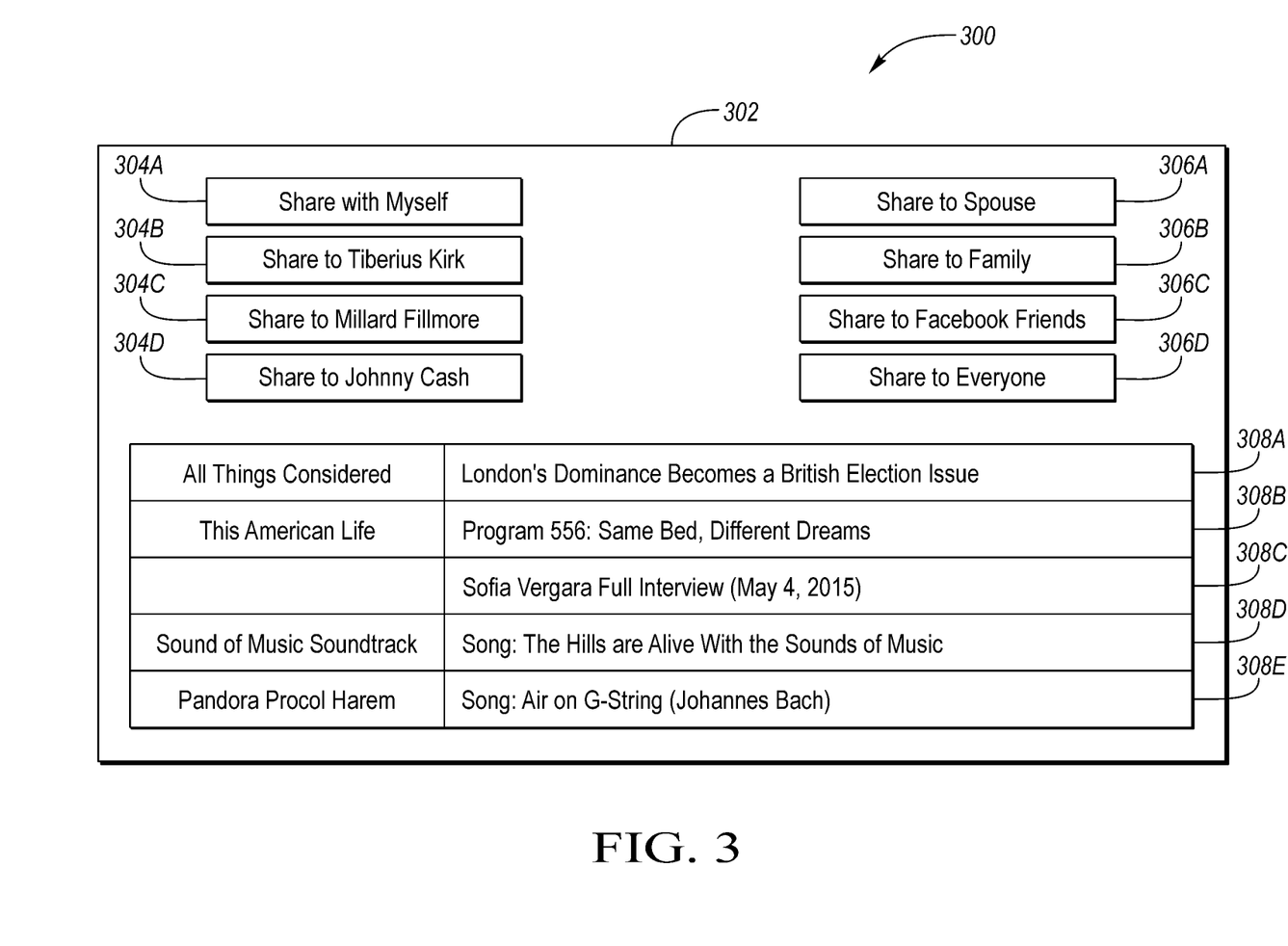
FIG. 3 is an illustration of a graphical user interface to share media between vehicles.

FIG. 3 is an illustration of a graphical user interface 300 (GUI) to share media between vehicles. A display 302 may be use project the image of the GUI so someone in the vehicle may select a destination. Here, the vehicles are identified by nicknames. In this example, passengers of vehicles labeled their respective vehicles with the nicknames Tiberius Kirk, Millard Fillmore, and Johnny Cash. In this example, the area of the screen associated with sharing media content with other vehicles via V2V communication or to store the media content for later use if designated by 304A-D. When the area of a screen 304A-D is touched, the system will send an invitation to the recipient designated. Also, a passenger of the vehicle may flag media content for later use by activating area 304A. In this example, there is an area 306 of the screen associated with sharing media content via cellular service or the internet. When the area of a screen 306A-D is touched, the system will send an invitation to the recipient designated. The recipient may be a single person, or a group, for example, sharing with Spouse 306A, and sharing with Family 306B, or Facebook friends 306C, or everyone 306D. Sharing with everyone 306D may include both broadcast via V2V and cellular networks. The content shown in this example includes the NPR talk show: All Things Considered 308A; This American Life 308B which may be a podcast, TV archive, downloaded file, or broadcasted stream; Sofia Vergara's Full Interview (May 4, 2015) 308C which is based on an interview with Howard Stern and available via satellite radio, or YouTube; Sound of Music Soundtrack 308D which is available as downloadable media or may be present on a personal music player, and Pandora Procol Harem 308E which is streamed via Pandora music streaming and recommendation services. Along with the content to share, the GUI may also display a trigger condition. The trigger condition may be a qualifier needed to allow the media content to be played or a qualifier needed to display the invitation to share the media content. The trigger condition may include a current location of the vehicle, a weather condition at a current location of the vehicle, a current speed of the vehicle, a date or a time of day on the date. Also, the trigger condition may include a signal based on detection of a passenger or a connection with a mobile device. For example, media content that includes images may only be accessible if the speed of the vehicle is zero or the song "Born to be wild" may play if the speed of the vehicle exceeds 75 miles per hour. Also, a song by the Beach Boys may play when a location of the vehicle is near to the ocean or a route on an infotainment center is entered with a destination near the ocean. Further, the detection of a passenger may trigger playing media content or even limit the available media content selection to a selected genre. And a combination of trigger conditions may be used to further qualify the media content such as an invitation to play soothing music may be trigger if a rear seat passenger is detected and the time is past 8:00 PM.

Figure 4:
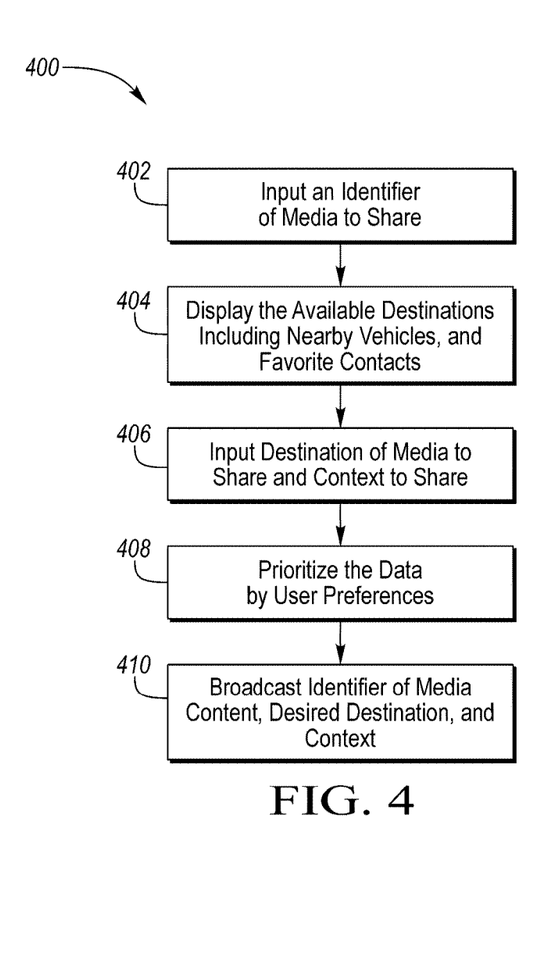
FIG. 4 is a flow diagram to originate shared media associated with context.

FIG. 4 is a flow diagram 400 to originate shared media associated with context. This flow diagram 400 is performed, executed or at the origination of the invitation to share media content. At operation 402, an identifier of media to share is input to a system or device such as an infotainment system, a personal multi-media device, a cellular device, or a telematics device. The identifier may include a title, artist, album, track number associated with a song or media file, an ID3 tag, or a Uniform Resource Locator (URL).

At operation 404, available destinations of the identifier are displayed on the system or device. The destinations include nearby vehicles, favorites, and contacts. The contacts may reside in the system or device, or may be loaded by a cellular or mobile device.

At operation 406 the destination and context associated with the media content is input to the device or system. As stated above the context may include a current location of the device, system or vehicle, a weather condition at a current location of the device, system, or vehicle, a current speed of the device, system, or vehicle, a date or a time of day on the date. Also, the context also referred to as the trigger condition may include a signal based on detection of a passenger of the vehicle or a connection with a mobile device.

At operation 408, the system or device prioritizes the media content or the identifier of media content based on user preferences. At operation 410, the system, device or vehicle broadcasts the identifier of media content, a desired destination, and the context or trigger condition. It is also possible to broadcasts the identifier of media content and a desired destination without the context or trigger condition in which the receiving system may then associate the identifier or invitation of media content to share with a context.

Figure 5:
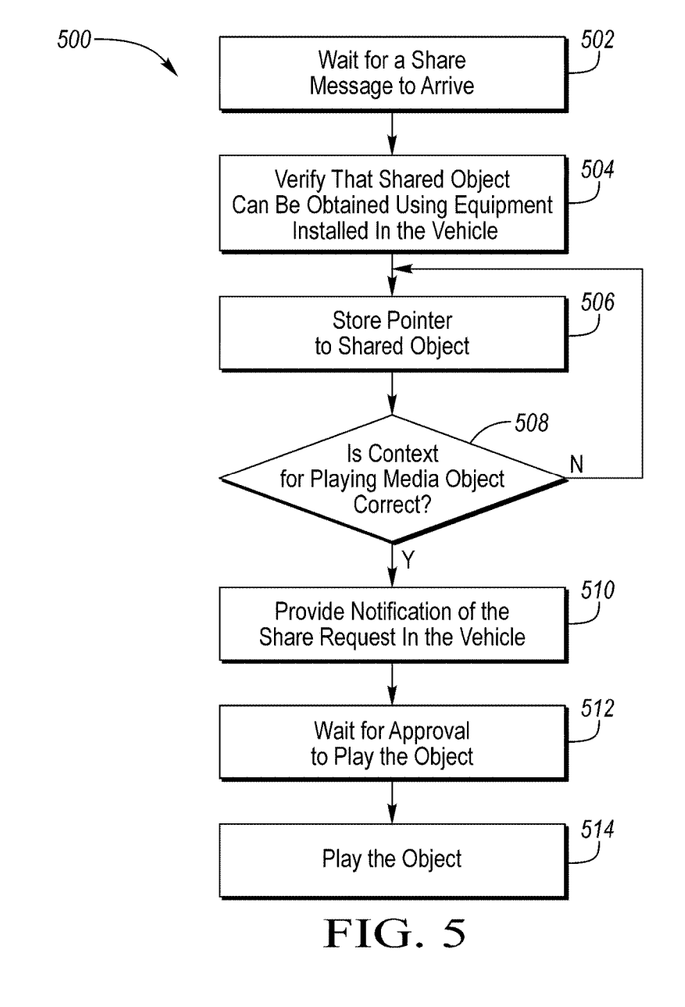
FIG. 5 is a flow diagram to receive and play shared media based on the context.

FIG. 5 is a flow diagram 500 to receive and play shared media based on the context. This flow diagram 500 may be at the receiving device, system or vehicle. At operation 502, the receiving device waits to receive a message. The receiving device may utilize a polling strategy or an interrupt strategy to wait for the message to arrive. At operation 504, the receiving device verifies that the invitation or shared object associated with media content can be obtained by equipment coupled with the vehicle or device. This includes determining the connection speed that may be used if the media content is streamed, a search of files on local non-volatile memory, or a search of Internet locations or applications associated with content servers. It also includes searching broadcast media including terrestrial radio, television, or other broadcast content structure. This also may include the media content currently broadcasting or a schedule of future broadcasting.

At operation 506, a pointer to the invitation or media content is stored in memory. At operation 508, the device, system or vehicle checks to see if the context associated with the media content is equivalent to the current context. The device may also consider the context within an acceptable range from the desired context. For example, one context would be to play media content if a vehicle is within 10 miles of the ocean. Another example would be to play media content if a location of the vehicle is within a range of 5 miles from the high school attended by the driver. If the context is not correct, the decision tree branches back to store the pointer and check if the context has changed and meets the requirements. If the context is correct, the decision tree continues to operation 510.

At operation 510, the receiving vehicle provides notification of the share request. The notification may include an audible alert, an audible message, a message on a display such as on a driver information console, an infotainment screen, an instrument cluster screen, a heads up display, or a haptic system in a seat or steering wheel. Also, the notification may be a combination of multiple notification mechanisms such as vibrating steering wheel and an audible alert.

At operation 512, the system or device such as a receiving vehicle waits for approval or confirmation from a passenger in the vehicle to play the media. At operation 514, the system or device plays the media content associated with the invitation or share request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a vehicle interface; and
a vehicle infotainment system including a processor configured to, responsive to a speed of the vehicle meeting or exceeding a predefined speed specified by an invitation from a source remote from the vehicle and that identifies media content, select a medium carrying the media content and play the media content via the vehicle interface, wherein the source remote from the vehicle is a remote vehicle infotainment system.

2. The vehicle of claim 1, wherein the medium is a terrestrial radio channel.

3. The vehicle of claim 1, wherein the medium is a file in non-volatile memory.

4. The vehicle of claim 1, wherein the media content is speech, music, or images.

5. The vehicle of claim 1, wherein the invitation is received using Dedicated Short Range Communications (DSRC).

6. The vehicle of claim 1, wherein the vehicle interface includes a display or speakers.

7. TheA vehicle of claim 1, wherein the processor is further configured to, responsive to ambient weather conditions matching predefined weather conditions specified by a second invitation from the source remote from the vehicle and that identifies second media content, select a second medium carrying the second media content and play the second media content via the vehicle interface.

8. A vehicle comprising:
a vehicle interface; and
a vehicle infotainment system including a processor configured to, responsive to indication that an occupant identity matches a predefined occupant identity specified by an invitation from a source remote from the vehicle and that identifies media content, select a medium carrying the media content and play the media content via the vehicle interface, wherein the source remote from the vehicle is a remote vehicle infotainment system.

9. The vehicle of claim 8, wherein the invitation from the source remote from the vehicle is received using Dedicated Short Range Communications (DSRC).

10. The vehicle of claim 8 further comprising media storage medium configured to store data files of multimedia content, wherein the processor is further configured to, responsive to reception of a share invitation from a remote source identifying media content and input indicative of selection of the media content received from a control interface of the vehicle, select a data tile from the media storage medium based on the share invitation and play the media content via the vehicle interface.

11. The vehicle of claim 8, wherein the indication is based on connection of the vehicle infotainment system with a mobile device.

12. The vehicle of claim 8, wherein the processor is further configured to, responsive to ambient weather conditions matching predefined weather conditions specified by a second invitation from the source remote from the vehicle and that identifies second media content, select a second medium carrying the second media content and play the second media content via the vehicle interface.

* * * * *